(12) United States Patent (10) Patent No.: US 7,823,112 B1
Makarov et al. (45) Date of Patent: Oct. 26, 2010

(54) METHOD, SOFTWARE AND SYSTEM FOR ENSURING TIMING BETWEEN CLOCKED COMPONENTS IN A CIRCUIT

(75) Inventors: Mikhail Makarov, Moscow (RU); Igor Chourkin, Moscow (RU); Mikhail Komarov, Moscow (RU); Boris Ginzburg, Santa Clara, CA (US)

(73) Assignee: Golden Gate Technology, Inc., San Jose, CA (US)

( * ) Notice: Subject to any disclaimer, the term of this patent is extended or adjusted under 35 U.S.C. 154(b) by 422 days.

(21) Appl. No.: 10/449,757

(22) Filed: May 30, 2003

(51) Int. Cl.
*G06F 17/50* (2006.01)
*G01R 31/28* (2006.01)

(52) U.S. Cl. .................. 716/12; 716/6; 716/7; 716/13; 716/14; 716/17; 716/18

(58) Field of Classification Search ............ 716/6, 716/7, 12–14, 17, 18; 714/725, 727, 736; 375/356; 365/201
See application file for complete search history.

(56) References Cited

U.S. PATENT DOCUMENTS

| | | | |
|---|---|---|---|
| 5,473,756 A * | 12/1995 | Traylor | ................. 710/57 |
| 5,521,837 A | 5/1996 | Frankle et al. | |
| 5,550,748 A | 8/1996 | Xiong | |
| 5,638,291 A | 6/1997 | Li et al. | |
| 5,644,496 A | 7/1997 | Agrawal et al. | |
| 5,717,729 A * | 2/1998 | Iknaian et al. | ............ 375/356 |
| 5,761,078 A | 6/1998 | Fuller et al. | |
| 5,774,380 A | 6/1998 | Pickup et al. | |
| 5,784,600 A | 7/1998 | Doreswamy et al. | |
| 5,798,936 A | 8/1998 | Cheng | |
| 5,918,058 A | 6/1999 | Budd | |
| 5,974,245 A | 10/1999 | Li et al. | |
| 5,987,086 A | 11/1999 | Raman et al. | |
| 6,080,201 A | 6/2000 | Hojat et al. | |
| 6,081,656 A * | 6/2000 | Witt | ............................ 716/3 |
| 6,086,631 A | 7/2000 | Chaudhary et al. | |

(Continued)

OTHER PUBLICATIONS

Yang et al., "Timing-driven placement using design hierarchy guided constraint generation", Nov. 10-14, 2002, Computer Aided Design, 2002. ICCAD 2002. IEEE/ACM International Conference on, pp. 177-180.*

(Continued)

*Primary Examiner*—Helen Rossoshek
(74) *Attorney, Agent, or Firm*—The Law Offices of Andrew D. Fortney; Andrew D. Fortney

(57) ABSTRACT

A method, software, and system for placing circuit elements and routing wires. The method, software, and system generally include the steps of (a) determining a boundary condition for signal paths between components in a circuit, wherein each of the components receives a clock signal and the signal paths include n wires and (n−1) circuit elements in alternating serial communication between the components, n being 2 or more; and (b) placing the circuit elements and routing the wires between the comments and the circuit elements such that no signal path in the circuit exceeds the boundary condition. In preferred embodiments, the boundary condition is a maximum length, and the method further includes placing the clocked components in a floor plan such that no signal path can exceed the boundary condition. The present invention advantageously ensures that timing requirements for signal paths between clocked circuit components are met automatically.

36 Claims, 9 Drawing Sheets

U.S. PATENT DOCUMENTS

| | | | |
|---|---|---|---|
| 6,099,583 | A | 8/2000 | Nag |
| 6,145,117 | A | 11/2000 | Eng |
| 6,212,489 | B1 | 4/2001 | Klein et al. |
| 6,230,304 | B1 | 5/2001 | Groeneveld et al. |
| 6,253,361 | B1 | 6/2001 | Buch |
| 6,305,001 | B1 * | 10/2001 | Graef ............... 716/12 |
| 6,321,183 | B1 | 11/2001 | Tatsumi |
| 6,341,092 | B1 * | 1/2002 | Agrawal ............ 365/201 |
| 6,397,170 | B1 | 5/2002 | Dean et al. |
| 6,415,420 | B1 | 7/2002 | Cheng et al. |
| 6,418,552 | B1 | 7/2002 | Osborn |
| 6,434,731 | B1 | 8/2002 | Brennan et al. |
| 6,442,739 | B1 * | 8/2002 | Palermo et al. ......... 716/6 |
| 6,453,446 | B1 | 9/2002 | Van Ginneken |
| 6,496,965 | B1 | 12/2002 | Van Ginneken et al. |
| 6,505,330 | B1 | 1/2003 | Osborn |
| 6,507,941 | B1 | 1/2003 | Leung et al. |
| 6,519,745 | B1 | 2/2003 | Srinivas et al. |
| 6,525,587 | B2 * | 2/2003 | Makino ............ 327/292 |
| 6,530,065 | B1 | 3/2003 | McDonald et al. |
| 6,543,041 | B1 * | 4/2003 | Scheffer et al. ......... 716/10 |
| 6,553,338 | B1 | 4/2003 | Buch et al. |
| 6,594,807 | B1 | 7/2003 | Tetelbaum et al. |
| 6,662,348 | B1 | 12/2003 | Naylor et al. |
| 6,681,338 | B1 | 1/2004 | Kollipara |
| 6,694,464 | B1 * | 2/2004 | Quayle et al. ......... 714/725 |
| 6,725,438 | B2 | 4/2004 | Van Ginneken |
| 6,785,873 | B1 | 8/2004 | Tseng |
| 6,817,005 | B2 | 11/2004 | Mason et al. |
| 6,842,045 | B2 * | 1/2005 | Shimazaki et al. ......... 326/95 |
| 6,845,494 | B2 | 1/2005 | Burks et al. |
| 6,851,095 | B1 | 2/2005 | Srinivasan et al. |
| 6,877,143 | B1 * | 4/2005 | Palermo et al. ......... 716/6 |
| 6,907,590 | B1 * | 6/2005 | Al-Dabagh et al. ......... 716/6 |
| 6,950,998 | B1 | 9/2005 | Tuan |
| 7,032,198 | B2 * | 4/2006 | Sano et al. ............ 716/5 |
| 7,039,887 | B2 * | 5/2006 | Khalil et al. ............ 716/5 |
| 7,062,425 | B1 | 6/2006 | Bell et al. |
| 7,178,124 | B1 * | 2/2007 | Makarov et al. ............ 716/12 |
| 2002/0069396 | A1 | 6/2002 | Bhattacharya et al. |
| 2002/0112220 | A1 | 8/2002 | Miller |
| 2003/0056185 | A1 * | 3/2003 | Nakajima ............ 716/5 |
| 2003/0208736 | A1 * | 11/2003 | Teng et al. ............ 716/7 |
| 2004/0015803 | A1 | 1/2004 | Huang et al. |
| 2004/0025129 | A1 * | 2/2004 | Batchelor ............ 716/6 |
| 2004/0049747 | A1 | 3/2004 | Yamasaki et al. |
| 2004/0073878 | A1 | 4/2004 | Hasegawa et al. |
| 2004/0150422 | A1 | 8/2004 | Wong |
| 2004/0199883 | A1 | 10/2004 | Palumbo |
| 2005/0034091 | A1 | 2/2005 | Harn |
| 2005/0050496 | A1 | 3/2005 | Kovacs et al. |
| 2006/0031795 | A1 | 2/2006 | Rahmat et al. |
| 2006/0168551 | A1 | 7/2006 | Mukuno |

OTHER PUBLICATIONS

Swinnen et al., "Timing issues related to the automated placement and routing of high performance ASICs", Sep. 23-27, 1991, ASIC Conference and Exhibit, Proceedings., Fourth Annual IEEE International, pp. P14-6/1-4.*

Yeh et al., "Sequential delay budgeting with interconnect prediction", Oct. 2004, Very Large Scale Integration (VLSI) Systems, IEEE Transactions on, vol. 12, Issue 10, pp. 1028-1037.*

Kay et al., "EWA: efficient wiring-sizing algorithm for signal nets and clock nets", Jan. 1998, Computer-Aided Design of Integrated Circuits and Systems, IEEE Transactions on, vol. 17, Issue 1, pp. 40-49.*

Yang et al., "Delay budgeting in sequential circuit with application on FPGA placement", Jun. 2-6, 2003, Design Automation Conference, 2003. Proceedings, pp. 202-207.*

Zhuoyuan et al., "Incremental placement algorithm for standard-cell layout", May 26-29, 2002, Circuits and Systems, 2002. ISCAS 2002. IEEE International Symposium on, vol. 2, pp. II-883-II-886 vol. 2.*

Datasheet, "CANDENCE SE-PKS," Cadence Design Systems, Inc., San Jose, California (2002).

"Cadence Design Systems—Silicon Ensemble-PKS," Apr. 9, 2003, http://www.cadence.com/products/sepks.html.

Datasheet, "Nano Encounter," Cadence Design Systems, Inc., San Jose, California (2003).

"Nano Encounter," printed Apr. 9, 2003, at http://www.cadence.com/products/nanoencounter.html.

"AutoCells 2002.1 Enhancement Value Sheet," Mentor Graphics Corp., Wilsonville OR (2002).

"OpenDoor Catalog, Avanti," printed Apr. 9, 2003, at http://www.mentor.com/partners/opendoo/Avant.html.

"Products—SVR SC," printed Apr. 9, 2003, at http://www.svri.com/sc.htm.

"Products—SVR FloorPlacer," printed Apr. 9, 2003, at http://www.svri.com/floorplacer.htm.

"Products—SVR GARDS," printed Apr. 9, 2003, at http://www.svri.com/gards.htm.

"Synopsys FlexRoute Top Level Router," Apr. 9, 2003, at http://www.synopsys.com/products/tlr/tlr_ds.html.

"Chip Architect," printed Apr. 9, 2003, at http://www.synopsys.com/products/designplanning/ca_ds.html.

"Synopsys Physical Synthesis," Apr. 9, 2003, at http://www.synopsys.com/products/phy_syn/phy_syn.html.

"Products—SVR QIC/APR," printed Apr. 9, 2003, at http://www.svri.com/qic-apr.htm.

Astro-Rail: A Comprehensive Power-Integrity Analysis, Implementation and Verification Tool; 2 Pgs.; Synopsys; www.synopsys.com; Mountain View, CA.

Advanced Clock Implementation; Blast Chip TM 3.0 User Guide; Magma Design Automation TM Incorporated; 52 Pgs; Cupertino, CA

* cited by examiner

METHOD, SOFTWARE AND SYSTEM FOR ENSURING TIMING BETWEEN CLOCKED COMPONENTS IN A CIRCUIT

FIELD OF THE INVENTION

The present invention generally relates to the field of circuit design, particularly integrated circuit design. More specifically, embodiments of the present invention pertain to methods, algorithms, software, systems and architectures for improving timing in the design of an integrated circuit and/or ensuring that timing constraints in an integrated circuit are met.

DISCUSSION OF THE BACKGROUND

Traditionally, in the field of integrated circuit design, the length of time that a signal takes to go from a predetermined origin to a predetermined destination (herein, generally referred to as "timing") is an important parameter. Integrated circuit designers typically include contributions from (1) transistors and/or other circuit devices (such as capacitors, resistors, diodes, etc.) and (2) wires when predicting or evaluating the timing of a particular design. As lines widths and device dimensions decrease, the relative contributions of wires to timing increase. At or below minimum or critical dimensions of 0.18 microns, wires become the major or dominant contributor to delays in timing.

Integrated circuits also generally have timing, or "clock," circuitry thereon. Such timing circuitry generally ensures that signals are captured at predetermined locations on the chip at certain times. The times at which certain circuit components capture data in the signals is generally defined by the clock signal waveform and the distribution of the clock signal to component locations on the chip.

Place and route software is generally used by integrated circuit designers to place circuit structures and/or configure wiring in a design automatically or semi-automatically. One typical challenge for place and route software has been to place circuit components (e.g., transistors, capacitors, diodes, logic gates, flip-flops, latches, registers, etc.) in a manner leaving sufficient room for wires to interconnect them. A number of such software tools are available in the marketplace today. However, such commercially available tools generally do not distinguish between clocked circuit components, such as flip-flops, latches and registers, and combinatorial circuit elements that do not receive a clock signal, such as switches and logic gates. Consequently, such tools generally do not ensure, or "guarantee by design," timing of signal paths from any clocked circuit component to the next downstream clocked circuit component. Rather, timing in a design is generally met by iteratively designing circuitry, then analyzing or determining the timing of various signal paths through the circuitry, and changing the design to shorten the signal paths that violate certain predetermined timing constraints or parameters.

Given the increasing demands on integrated circuit designers to create chips of increasing density, decreasing wire and transistor widths, and decreasing power supply and power consumption, it is difficult, if not impossible, to ensure meeting timing constraints automatically or "by design." Increasing the complexity, flexibility and/or functionality of the circuitry on a chip exacerbates these challenges. Thus, what is needed is a tool with which integrated circuit designers can ensure timing of signals from any given origin to any given destination in a circuit.

SUMMARY OF THE INVENTION

Embodiments of the present invention relate to methods, algorithms, software, architectures and/or systems for placing circuit elements and/or routing wires in a circuit design, such that the design automatically meets timing constraints between circuit components receiving a clock signal.

The present invention advantageously ensures that timing requirements for signal paths between clocked circuit components (such as flip-flops and/or registers) are met automatically or "by design." In certain preferred embodiments, the invention helps to reduce power consumption, improve timing between circuit blocks and/or clock domains on an integrated circuit, improve pin-to-pin timing at a chip level, and/or reduce the total number of circuit elements and/or components in a design.

These and other advantages of the present invention will become readily apparent from the detailed description of preferred embodiments below.

DETAILED DESCRIPTION OF THE PREFERRED EMBODIMENTS

Figure 1:
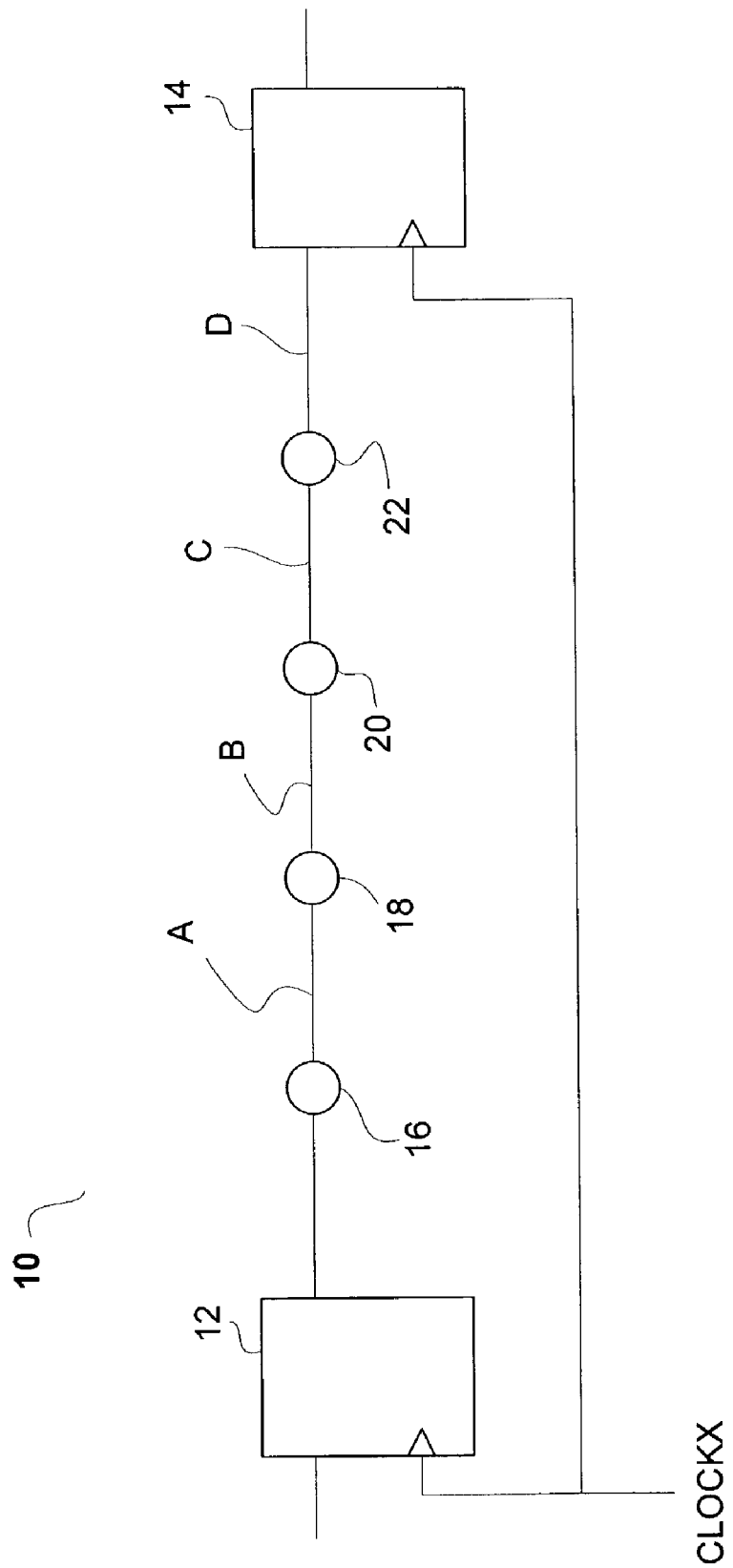
FIG. 1 is a box diagram showing an exemplary F-arc.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of processes, procedures, logic blocks, functional blocks, processing, and other symbolic representations of operations on code, data bits, data streams or waveforms within a computer, processor, controller and/or memory. These descriptions and representations are generally used by those skilled in the data processing arts to effectively convey the substance of their work to others skilled in the art. A process, procedure, logic block, function, process, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like, and to their representations in computer programs or software as code (which may be object code, source code or binary code).

It should be borne in mind, however, that all of these and similar terms are associated with the appropriate physical quantities and/or signals, and are merely convenient labels applied to these quantities and/or signals. Unless specifically stated otherwise and/or as is apparent from the following discussions, it is appreciated that throughout the present application, discussions utilizing terms such as "processing," "operating," "computing," "calculating," "determining," "manipulating," "transforming," "displaying" or the like, refer to the action and processes of a computer or data processing system, or similar processing device (e.g., an electrical, optical, or quantum computing or processing device), that manipulates and transforms data represented as physical (e.g., electronic) quantities. The terms refer to actions and processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture.

Furthermore, in the context of this application, the terms "net list" and "hardware description" may be used interchangeably to refer to a circuit design represented in an appropriate language, such as VERILOG, HDL or VHDL. Similarly, the terms "wire," "wiring," "line," "signal," "conductor" and "bus" refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Similarly, for convenience and simplicity, the terms "clock," "time," "timing," "rate," "period" and "frequency" are, in general, interchangeable and may be used interchangeably herein, but are generally given their art-recognized meanings. Also, for convenience and simplicity, the terms "data," "data stream," "waveform" and "information" may be used interchangeably, as may (a) the terms "flip-flop," "latch" and "register," and (b) the terms "connected to," "coupled with," "coupled to," and "in communication with," but these terms are generally given their art-recognized meanings herein.

The present invention concerns a method and/or algorithm (e.g., a computer-readable set of instructions) for placing circuit elements and routing wires, comprising the steps of (a) determining a boundary condition for signal paths between components in a circuit, wherein each of the components receives a clock signal and a plurality of the signal paths comprise n wires and (n−1) circuit elements in alternating serial communication between the components, n being an integer of 2 or more; and (b) placing the circuit elements and routing the wires between the components and the circuit elements such that no signal path in the circuit exceeds the boundary condition. In preferred embodiments, the boundary condition comprises a maximum length, and the method further comprises placing the clocked components in a floor plan such that no signal path in said circuit can exceed said boundary condition.

In a further aspect of the invention, the method relates to verifying a circuit design, comprising the steps of determining whether, in a floor plan corresponding to said circuit, any of a plurality of signal paths between components receiving a clock signal exceeds a boundary condition, where each of the signal paths comprise n wires and (n−1) circuit elements in alternating serial communication, n being an integer of 2 or more; and if any of said signal paths exceeds said boundary condition, then (i) re-placing at least one of said circuit elements and/or said circuit components in a different location in said floor plan, and (ii) re-routing said wires between re-placed circuit elements and/or circuit components such that no signal path in said circuit exceeds said boundary condition.

In a further aspect of the invention, the software relates to a medium or waveform containing a computer-readable set of instructions, where the instructions comprise (a) calculating a boundary condition for all signal paths between components in a circuit, wherein each of said components receives a timing signal in a common clock domain and a plurality of said signal paths independently comprise n wires and (n−1) circuit elements in alternating serial communication between said components, n being an integer of 2 or more; and (b) placing said circuit elements and routing said wires between said components such that no signal path in said circuit exceeds said boundary condition. In an even further aspect of the invention, the system comprises a general purpose computer or workstation that includes the present software and is configured to execute the steps of the present method(s) and/or algorithm(s).

In a further aspect of the invention, the chip or circuit architecture comprises at least one block of circuitry having a plurality of signal paths, each of the signal paths comprising (a) first and second components at the endpoints thereof, and (b) at least two wires and at least one combinational circuit element alternately, serially coupled between said first and second components, wherein each component receives a clock signal and each signal path does not exceed a predetermined boundary condition.

The invention further relates to hardware and/or software implementations of the present architecture, method and system. The invention, in its various aspects, will be explained in greater detail below with regard to exemplary embodiments.

F-Arcs and an Exemplary Implementation of the Invention

FIG. 1 shows a simple signal or data path 10 from a first circuit component 12 receiving a clock signal (e.g., CLOCKX) to a second circuit component 14 receiving the same clock signal. Between first and second circuit components 12 and 14 are circuit elements 16, 18, 20 and 22.

Signal/data path 10 is a very simple example of an F-arc. Generally, an "F-arc" is considered herein to be a signal path having two components at its endpoints and a series of alternating wires and combinational circuit elements between the two components, where the components receive a common clock signal (e.g., the same clock or logically equivalent clocks).

First and second circuit components 12 and 14, which may be the same or different, are generally any circuit or device configured to operate under the control of, or in response to, a clock signal. First and second circuit components 12 and 14 may be edge- or voltage level-controlled or -triggered. Examples of suitable circuit components include storage or memory components, such as a flip-flop, a latch or a register; switches or gates, such as a transistor configured to receive the clock signal at its gate; a counter; a synchronous adder or subtractor; a divider or multiplier; parallel combinations thereof; etc. Preferably, circuit components receiving a clock signal comprise a flip-flop or a register.

Circuit elements 16, 18, 20 and 22, which may be independently selected, are generally any circuit or device not configured to receive a clock signal. Suitable examples include an inverter or a buffer (e.g., an even-numbered series of inverters, typically 2 inverters in series, which may be 3-statable or configured to be placed in a "high z" state); a switch or transistor receiving a control signal (other than a clock) at its gate; a logic gate (such as an AND, OR, NAND, NOR, or XOR gate); a multiplexer or demultiplexer; a comparator, encoder or decoder; an combinational adder or subtractor; parallel or serial combinations thereof; etc. While the invention focuses on F-arc signal paths having at least one circuit element therein, preferably the signal paths include at least 2 circuit elements, and more preferably at least 3 circuit elements. While the upper limit of circuit elements is constrained only by the design and fabrication technology available, typical upper limits in a 0.15 or 0.18 micron fabrication technology and design are on the order of 15-20 circuit elements.

Similarly, the length of wires has upper and lower limits constrained only by the design and fabrication technology available. However, typical lower limits in a 0.15 or 0.18 micron fabrication technology and design are on the order of 4× the minimum feature dimension of the immediately underlying layer (e.g., for a 0.15 micron wide transistor, a minimum length for the first layer of metal is about 0.6 microns), while typical upper limits in a 0.15 or 0.18 micron fabrication technology and design are on the order of about 1000 microns (preferably about 500 microns).

In general, the invention relies on a boundary being placed on the maximum length of an F-arc. This maximum length may be based on input data relating to characteristic properties of the fabrication process used to make the circuit and/or provide timing signals to the circuit. Such input data generally include (i) a period or frequency of the clock signal, (ii) a resistivity of the wire in the F-arc, (iii) an operating voltage and/or (iv) a characteristic resistivity or time delay contributed by each circuit element in the F-arc. However, for design rules at or below 0.18 microns, the characteristic resistivity or time delay contributed by each circuit element may be negligible in comparison with the time delays contributed by the wires, and may be ignored or taken into account by a simple approach. For convenience and/or simplicity, one may simply factor in a potential maximum delay that could be caused by a combination of circuit elements and processing and operational "corners (e.g., processing and/or fabrication variations, operating voltage fluctuations, etc.), and decrease the applicable length of time (e.g., the clock period or fraction or multiple thereof) by that potential maximum delay.

In certain embodiments, the method and/or algorithm further include identifying, defining or specifying an F-arc as any combinational path between two clocked circuit components. One skilled in the art understands how to identify in a net list (or hardware description) circuit components receiving a clock signal, combinational circuit elements and wires (or "nets") between such combinational circuit elements or between such a circuit component and a combinational circuit element. One skilled in the art understands also how to write code (which in one embodiment, may be source code) that will predict certain properties and/or characteristics for F-arcs, compare such properties and/or characteristics for each F-arc identified against a boundary and determine whether each such F-arc is allowed or disallowed, and (iteratively) re-place circuit components and elements and/or re-route wires so that all identified F-arcs are allowed. The boundary condition identified against each F-arc may be determined empirically.

The wires themselves may directly link only two combinational circuit elements or a combinational circuit component and a combinational circuit element, or they may be branched (e.g., linking a combinational circuit element to two or more combinational circuit elements or vice versa, or a clocked circuit component to two or more combinational circuit elements or vice versa). The inventive method also encompasses further embodiments where the signal path in an additional F-arc has no combinational circuit elements, but instead, includes only a wire (which may comprise two or more segments as discussed above).

Furthermore, there is no maximum limit to the number of F-arcs to which the method and/or algorithm can be applied. However, circuit designers generally attempt to keep designs as small as possible and/or feasible, while still achieving desired functionality and/or performance. These "natural" constraints will generally tend to limit the number of F-arcs in a circuit, circuit block or chip design. However, in a typical design of moderate to high complexity, there will be at least a million F-arcs to be placed and routed, frequently several million F-arcs or more, and occasionally 10 million or more F-arcs.

In the simplest case, the boundary placed on the F-arc corresponds to the period of one clock cycle. In other words, an F-arc violates the boundary condition if it takes longer than one clock cycle for a signal to traverse the F-arc. Of course, other boundary conditions may apply, such as one-half of a clock cycle (e.g., for two components defining the endpoints of an F-arc that receive complementary clock signals CLOCK and CLOCKb), or x clock cycles, where x is an integer of at least 2. One skilled in the art is capable of designing circuitry configured to account for and/or control such conditions.

The wire resistivity is generally known from the process technology to be used for fabricating the device being designed. The wire resistivity may be characterized as a sheet resistance, a bulk resistivity, or other known resistance or resistivity parameter, and it may be calculated for a given wire from such resistance or resistivity and the height and width of the wire (which are also known for a known process technology).

The time delay is generally a constant value for a given circuit element having certain dimensions in a known process technology. For example, a transistor of a known type and having predetermined dimensions in a given process technology will generally cause a delay of known or calculable length in a signal changing states. Furthermore, operating voltages are generally standard or predetermined values for a given minimum transistor dimension (generally width). As a result, a given set of design rules for a given process technology will generally have a fixed and/or predetermined operating voltage.

Figure 2:
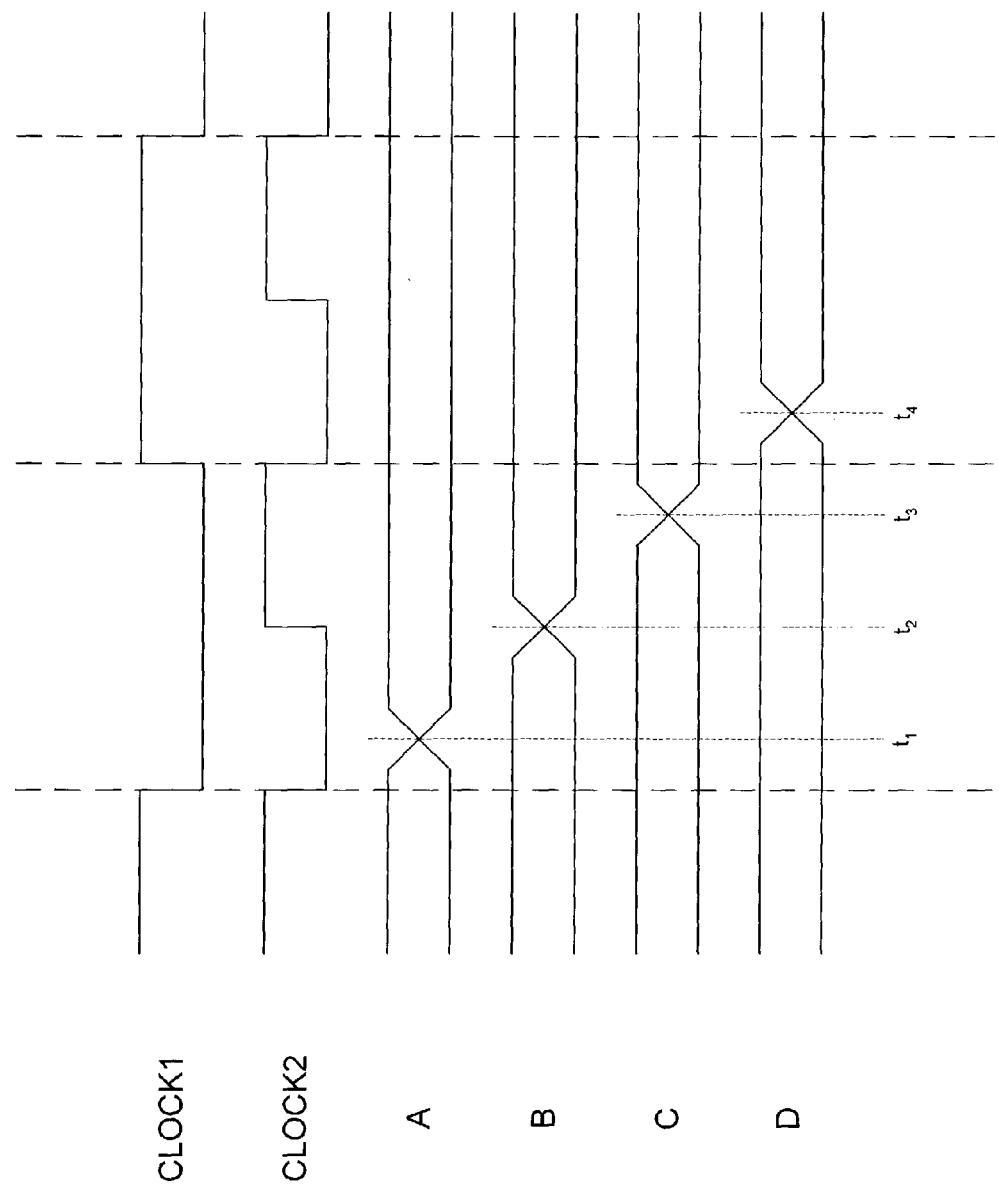
FIG. 2 is a set of waveforms for illustrating how the invention operates with respect to the F-arc of FIG. 1.

Now referring to FIG. 2, two different exemplary waveforms, CLOCK1 and CLOCK2, are shown for the generic clock signal, CLOCKX. CLOCK1 has a relatively long period and low frequency, and CLOCK2 has a relatively short period and high frequency. Although the exemplary clock signal CLOCK1 is shown having a period twice that of CLOCK2, this is simply for ease of illustration only.

The state of a signal along exemplary F-arc 10 can be determined at nodes A, B, C and D (respectively, along the wires immediately downstream from circuit elements 16, 18, 20 and 22) at certain times. As shown by the waveforms in FIG. 2, component 12 is a negative edge-triggered component. The state of the signal at node A may change a certain time $t_1$ after CLOCKX changes state. Similarly, the state of the signal at nodes B, C and D may change a certain time $t_2$, $t_3$ and $t_4$, respectively, after the negative edge of CLOCKX is received at component 12. To a first approximation, the signal is received by component 14 immediately after the characteristic time that node D can change state, $t_4$.

In this example, for simplicity, the maximum F-arc length is determined in part on a one clock period length of time. When CLOCK1 is operable, $t_4$ is less than one period of CLOCK1, and the length of F-arc 10 falls comfortably below the CLOCK1-defined maximum. On the other hand, since $t_4$ is greater than one period of CLOCK2, when CLOCK2 is operable, the length of F-arc 10 exceeds the boundary condition defined in part by the CLOCK2 period.

F-arcs that exceed the maximum length boundary are disallowed. By doing so, the present invention ensures that signal propagation timing requirements are met in a circuit, circuit block and/or circuit design receiving a particular clock. In the present invention, the clock signal need not be the same signal for all timing-controlled components on a chip, only that the signal or a logical equivalent thereof (e.g., an integer multiple and/or divisor thereof, complement thereof, etc.) be supplied to all such components within a given circuit or block of circuitry. In other words, the invention applies a maximum boundary condition on all F-arcs within a common clock domain.

Thus, in one aspect, the invention concerns a method of placing and routing, comprising the steps of (a) determining a maximum length of a signal path between components in a circuit, and (b) placing circuit elements and routing wires between the components such that no signal path in the circuit has a length exceeding the maximum length. In the invention, the signal path generally contains two or more wires and one or more circuit elements, and each of the components receives a clock signal. Generally, the circuit elements do not receive the clock signal.

In further embodiments, the method further includes the step(s) of routing or distributing the clock signal to the components; placing the components and/or circuit elements in a floor plan corresponding to said circuit; and/or routing the wires from a first component to one or more first circuit elements, and from one or more first circuit elements to either one or more second circuit elements or said second component. In even further embodiments, wires can be routed along any number of circuit elements, as long the final wire in the signal path is to a second component and as long as the maximum boundary condition on F-arcs is not violated.

Alternatively, as will be readily apparent to those skilled in the art, a maximum F-arc length is but one boundary condition encompassed by the present invention. Other exemplary F-arc boundary conditions, which may be related to time, length, resistance and/or other physical properties of an F-arc, include a maximum time or delay for signal propagation along the F-arc, a maximum resistance and/or capacitance, a maximum or minimum inductance, a maximum and/or minimum impedance (depending on the states of the F-arc, the second component and/or the circuitry downstream from the second component), etc.

Exemplary Application #1

Figure 3:
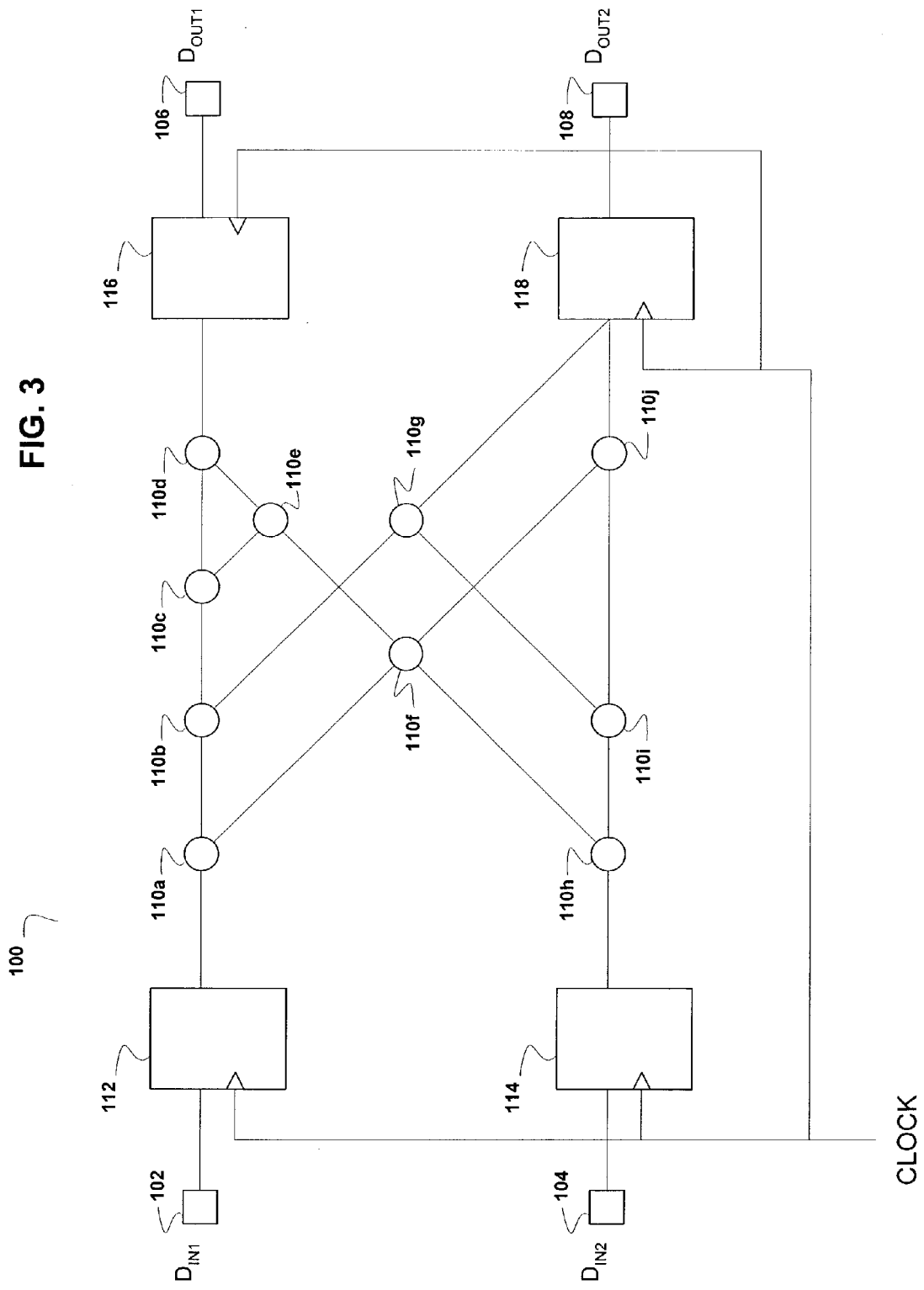
FIG. 3 is a box diagram showing a relatively simple, exemplary array of gates between two pairs of flip-flops, in which the present invention may be implemented.

Referring now to FIG. 3, a functional circuit block 100 may comprise an array of logic elements 110a-110j that process data signals $D_{IN1}$ and $D_{IN2}$, respectively received at input nodes 102 and 104, and outputs data signals $D_{OUT1}$ and $D_{OUT2}$ at output nodes 106 and 108, respectively. Data signals $D_{IN1}$ and $D_{IN2}$ are clocked into flip-flops 112 and 114, and data signals $D_{OUT1}$ and $D_{OUT2}$ are clocked out of flip-flops 116 and 118, by a timing signal CLOCK. As mentioned above, flip-flops 112, 114, 116 and 118 are exemplary circuit components receiving a timing signal within a common clock domain, and logic elements 110a-110j are examples of circuit elements (generally comprising one or more transistors, or preferably, one or more buffers) that do not receive a clock signal. Thus, for the purposes of explaining the invention, circuit elements that do not receive a clock signal may be considered "combinational."

The circuit elements are electrically coupled to each other and to circuit components by wires, as shown in FIG. 3. When actually fabricated, the wires may be located on the same or different layers of metallization in the chip, and may individually comprise one or more wire segments, electrically coupled to each other and/or to circuit elements by contacts or vias. Each of the wire segments and the contacts or vias contributes to the length and/or propagation/delay time of the F-arc. Furthermore, there is no defined or specific relationship between the locations of circuit element depictions 110 in FIG. 3 and the locations of actual, physical circuit elements in the fabricated chip. However, there may be a general correlation in that circuit element depictions 110 that are proximate to each other in FIG. 3 (e.g., 110c and 110b) are likely to correspond to physical circuit elements that are proximate to each on the fabricated chip (or at least relatively closer to each other than to relatively distant circuit elements in the depiction in FIG. 3), and circuit element depictions 110 that are relatively distant from each other in FIG. 3 (e.g., 110a and 110j) are likely to correspond to physical circuit elements that are relatively distant from each other on the fabricated chip.

In another aspect, the present invention concerns a method, algorithm and software that determines or calculates an F-arc boundary condition from certain input data, then places combinational circuit elements and routes wires that enable electrical communication to form F-arcs such that F-arcs that exceed the boundary condition are disallowed. A flow chart outlining an exemplary embodiment 200 of the method and/or algorithm is shown in FIG. 4.

Figure 4:
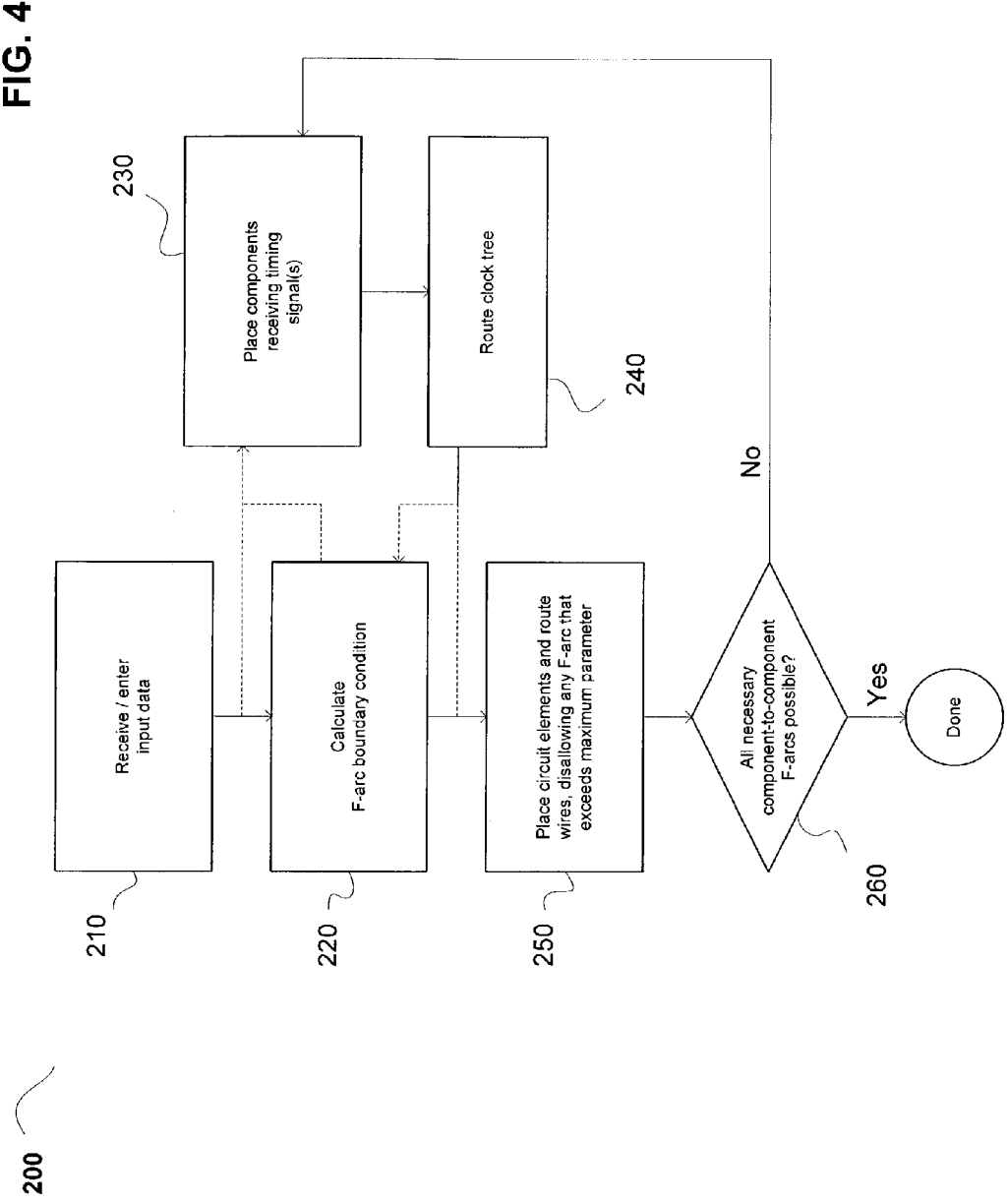
FIG. 4 is a flow chart outlining the steps taken in one embodiment of method and/or algorithm of the present invention.

In the general method and/or algorithm of the invention, input data relating to characteristic properties of the fabrication technology and or timing signals for the circuit being designed are input into the design software (see step 210 of FIG. 4). In some embodiments, such input data may be automatically generated and/or received by the design software by selection or designation of the fabrication process and/or operating frequency of an internal or external (master) clock signal. From this input data, the F-arc boundary condition is calculated (see step 220 of FIG. 4). In preferred embodiments, the F-arc boundary condition is a maximum length or maximum time delay, more preferably a maximum length.

Figure 5:
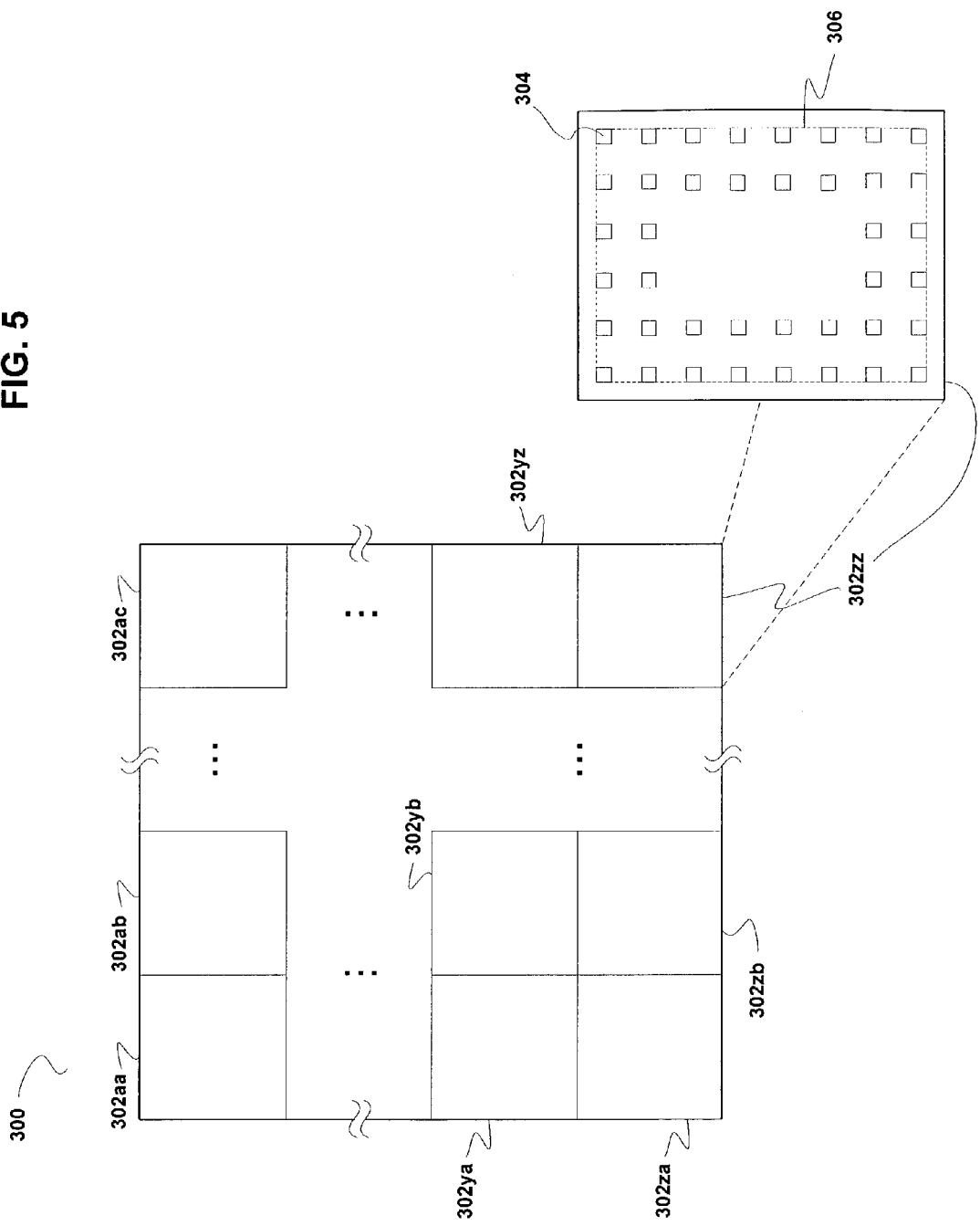
FIG. 5 is a diagram showing a preferred embodiment of the present invention.

In parallel or in serial fashion, components of the circuit receiving a clock or timing signal are placed in a floor plan corresponding to the physical circuit being designed. In one embodiment, such components are placed without reference to the F-arc boundary condition (e.g., before determining or calculating the F-arc boundary condition, or in parallel with such determination or calculation). In another (and preferred) embodiment, the method and/or algorithm places such components in the floor plan in a manner disallowing any placement that will exceed or violate the boundary condition (e.g., components are placed after determining or calculating the F-arc boundary condition). Now referring to FIG. 5, in an even more preferred embodiment, the floor plan 300 comprises a plurality or array of tiles 302aa-302zz, and the method and/or algorithm places components 304 in at least a subset of the tiles in an array or a regular or evenly-spaced pattern 306 (also see U.S. patent application Ser. No. 10/452,811, filed May 30, 2003 and incorporated herein by reference).

Referring back to FIG. 3, components 112, 114, 116 and 118 have been placed with regular spacing between components. For example, the distance between individual "input" components (i.e., components 112 and 114) is the same as the distance between individual "output" components (i.e., components 116 and 118). Also, the distance between any "input" component and its nearest "output" component (e.g., components 112 and 116, or 114 and 118) is the same. However, the invention is not so constrained; clocked circuit components can be placed in any allowed location, preferably such that the F-arc boundary condition is not violated. Thus, all of the possible signal paths in FIG. 3, from any "input" component to any "output" component along any possible series of wires and circuit elements 110, have a length below the maximum allowed F-arc length.

Thus, the invention is not only useful for preventing disallowed F-arcs (e.g., ensuring intra-circuit timing between clocked components "by design"), but also for detecting or finding erroneously placed and/or routed F-arcs, and optionally, replacing components or combinational circuit elements and rerouting wires to correct such design errors. Consequently, in further embodiments, the inventive method and/or algorithm may be included as part of a circuit design verification tool, in which timing of a fully placed and routed circuit is verified at a number of levels, from chip input pin to chip output pin, circuit block input node to circuit block output node, clock domain input node to clock domain output node, and/or (as described herein) F-arc input component to F-arc output component.

Although specific steps are disclosed in regard to the operation of the exemplary method and/or algorithm of FIG. 4, such steps are exemplary. That is, the present invention is well suited to use with various other steps or variations of the steps described above. Additionally, for purposes of clarity and brevity, the discussion herein is directed at times to specific examples. The present invention, however, is not limited solely to use with a particular architecture, method, process, software tool or device. Instead, the present invention is well suited to use with other architectures, software, circuitry, methods and processes in which it may be desirable to accomplish a multitude of tasks as part of an overall process directed at ensuring timing at a clocked circuit component level.

Further examples of suitable systems, tools and/or methods in which the present invention is generally applicable include those described in, e.g., U.S. Pat. Nos. 6,080,201, 6,212,489, 5,798,936 and 5,550,748, the relevant portions of which are each incorporated herein by reference, and those commercially available from place-and-route software vendors such as Cadence Design Systems (e.g., the SILICON ENSEMBLE™, SILICON ENSEMBLE-PKS™, FIRST ENCOUNTER™, and NANO ENCOUNTER™ tools), Silicon Valley Research, Inc. (e.g., the QIC/APR™, GARDS™, SC™ and FLOORPLACER™ tools), Synopsis (e.g., the CHIP ARCHITECT™, DESIGN COMPILER™, and FLOORPLAN COMPILER™ tools) and Mentor Graphics (e.g., the AUTOCELLS™ tool).

Exemplary Application #2

Figure 6:
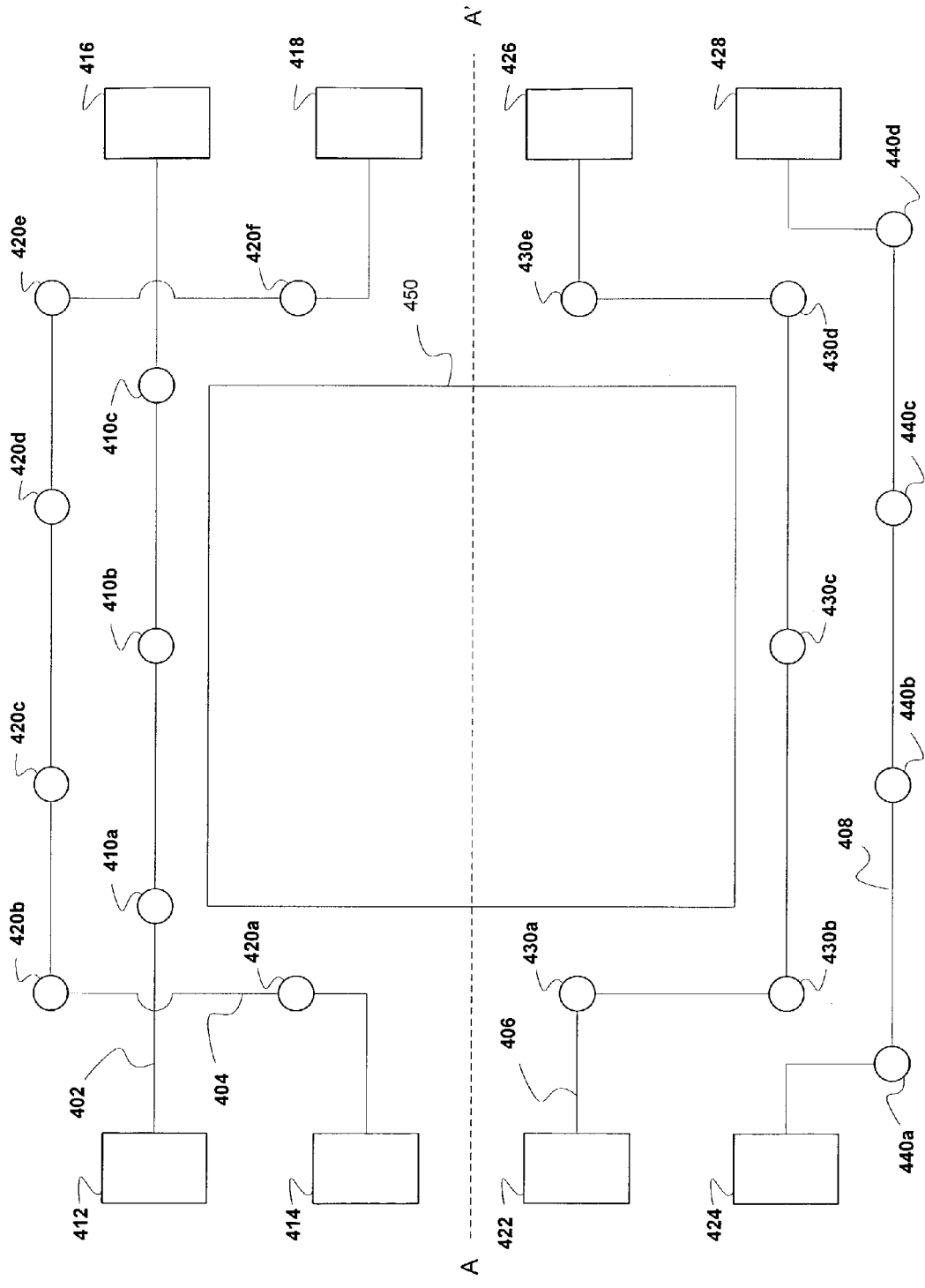
FIG. 6 shows a simplified layout showing a number of signal paths between clocked circuit components, further illustrating an exemplary operation of the present invention.

FIG. 6 shows a simplified, exemplary circuit layout 400 comprising F-arcs 402, 404, 406 and 408, for further illustrating the present invention. In general, component and signal/bus numbers common to both FIGS. 3 and 6 reflect the suitability of the same structures, signals and/or functions for both of the exemplary embodiments. However, these examples do not require that the same component(s), signal(s), bus(ses) and/or function(s) be used or implemented in both examples, other than as specifically described herein.

Input data or signals are received by clocked circuit components 412, 414, 422 and 424, which store or hold the data or signal on the appropriate edge, transition and/or logic level of the clock, in accordance with conventional design. For clarity, the clock signal is not shown in FIG. 6. The data or signals are propagated in parallel through a series of combinational circuit elements 410a-410c, 420a-420f, 430a-430e and 440a-440d, and are input into or stored in "output" components 416, 418, 426 and 428 on the next appropriate clock edge or level. Block 450 is a disallowed placement area (e.g., it is devoted to a circuit function such as memory/storage, signal and/or data processing, clock signal generation, power/current transmission, etc.).

One issue the invention addresses is placing circuit components and elements and routing wires around disallowed placement areas. Again, for purposes of illustrating the invention, input components 412 and 414 are complementary to input components 422 and 424 with respect to the A-A' axis bisecting disallowed placement area 450, and output components 416 and 418 are similarly complementary to output components 426 and 428. If a circuit design requires routing signals from a set of input components, around bisecting disallowed placement area 450, to a set of output components, the invention provides a tool by which such routing can be accomplished while ensuring that timing constraints are met at the level of clocked components, such as flip-flops, latches and registers.

Figure 7:
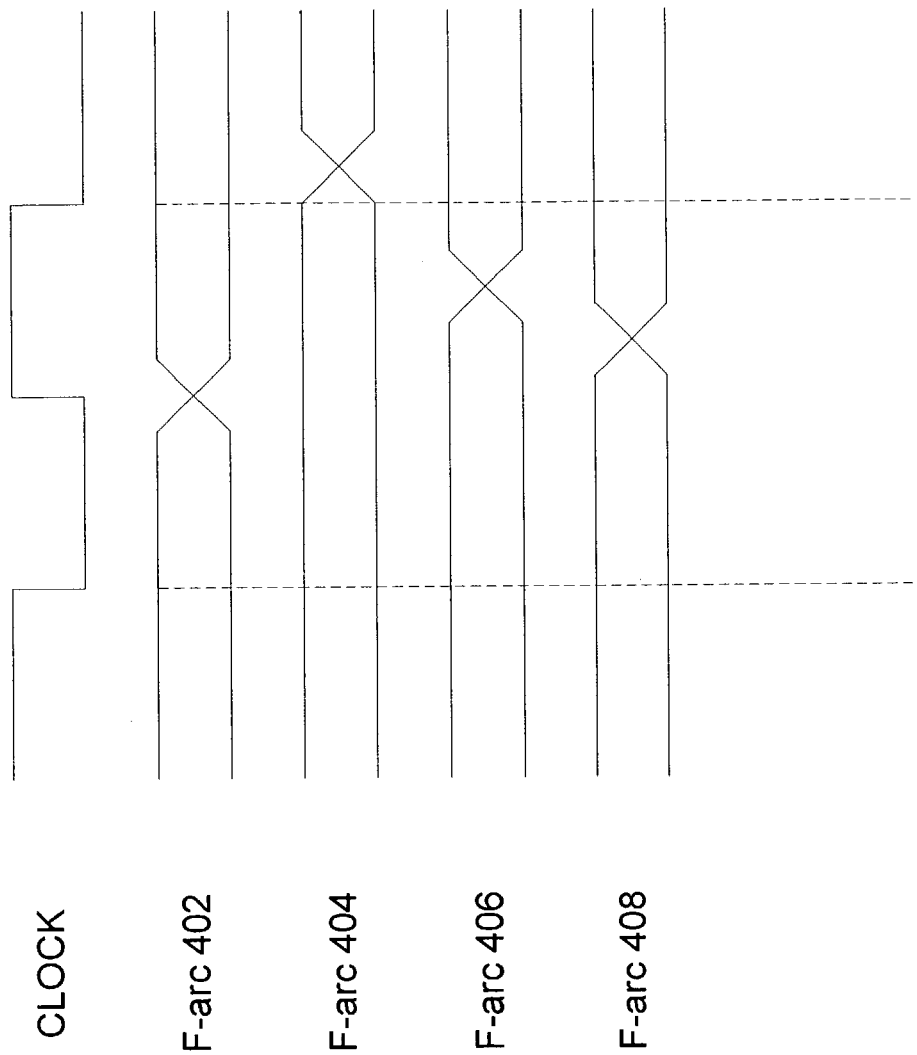
FIG. 7 is a set of waveforms for illustrating how the invention operates with respect to the layout of FIG. 6.

Referring now to FIG. 7, for purposes of illustration, the F-arc boundary is based on a one clock period length of time. F-arc 402, which is relatively short in comparison to the other F-arcs of FIG. 6, easily falls below the boundary condition. However, F-arc 404, which is relatively long in comparison to the other F-arcs of FIG. 6, exceeds the boundary condition. Such a circuit element placement and wire routing would be disallowed by the present invention.

On the other hand, F-arcs 406 and 408, which have lengths intermediate to those of F-arcs 402 and 404, both fall below the boundary condition. Consequently, this placement is allowed by the present invention, and the present invention would automatically place combinational circuit elements and wires (and optionally, components receiving a clock signal) in this manner rather than as shown for F-arcs 402 and 404.

An Exemplary Chip Architecture and/or Design

Figure 8:
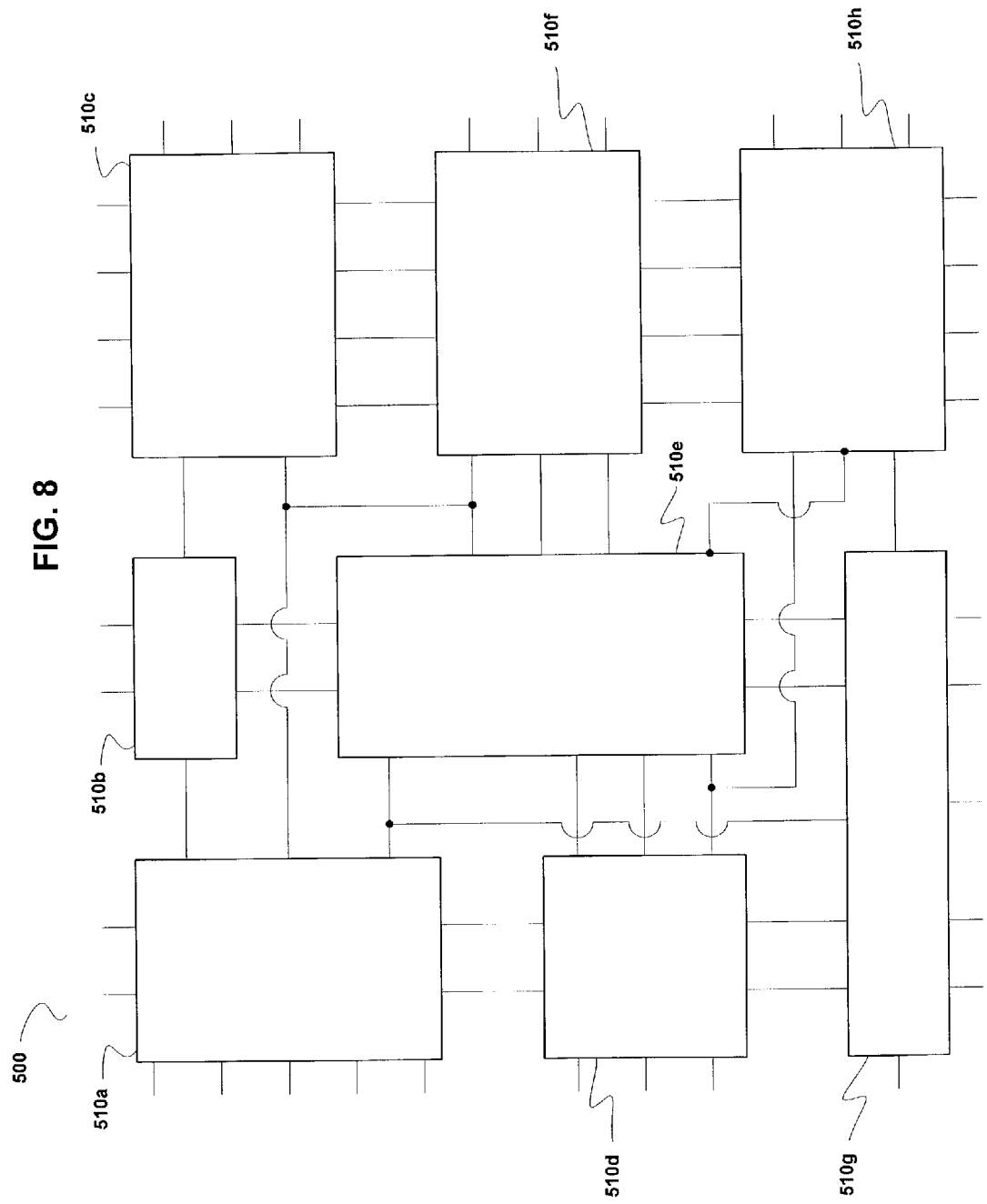
FIG. 8 is an exemplary box-level chip design, in which the present invention may be implemented.

FIG. 8 shows an exemplary architecture and/or a chip-level design 500, comprising a plurality of functional blocks and/or clock domains 510a-510i, wherein at least 1 (and preferably at least 2) of the functional blocks and/or clock domains are designed according to the method(s) described above. Functional blocks and/or clock domains 510a-510i are individually connected with other functional blocks and/or clock domains via wires or busses, which may be single bit or multi-bit, and which may comprise a single wire segment or multiple wire segments as described above. In general, a "functional block" is a block of circuitry that physically occupies an area on a chip defined by a single border (although the border may be arbitrary in shape and/or dimensions), and a "clock domain" is circuitry that receives a common clock signal or its logical equivalent, in order to have certain events within the circuitry occur at expected and/or predetermined times. Preferably, the invention applies to a chip having at least 2 clock domains, and each clock domain comprises one or more functional blocks.

This, the invention further relates to a chip architecture, in which at least one block of circuitry comprises a plurality of signal paths, each of the signal paths having first and second components at the endpoints thereof and comprising at least 2 wires and at least 1 combinational circuit element alternately and serially coupled between the first and second components, in which each component receives a clock signal (the same clock signal or a logical equivalent thereof) and each signal path does not exceed a predetermined boundary condition. In preferred embodiments, the block of circuitry comprises components that are regularly spaced from the nearest component thereto, and the boundary condition comprises a maximum length.

Naturally, the invention is not limited to a design having the same number or configuration of blocks 510 and/or wires. However, in preferred embodiments, the chip design has at least 2 such blocks, more preferably at least 4 such blocks, that are coupled at least to physically adjacent blocks by either (i) a plurality of single-bit wires, or (ii) at least one multi-bit bus. For example, in FIG. 8, blocks 510a-c may each operate according to a common clock signal, in which case at least one of the wires between blocks so operating electrically communicates the clock signal from one block to the other block. In addition, blocks 510d-i may each operate in a common clock domain, in which case one of the blocks provides a clock generation, clock replication and/or clock recovery function, and at least one of the wires from the block providing such clock function(s) to the other block(s) electrically communicates the generated, replicated and/or recovered clock signal.

An Exemplary System for Performing the Present Method

Figure 9:
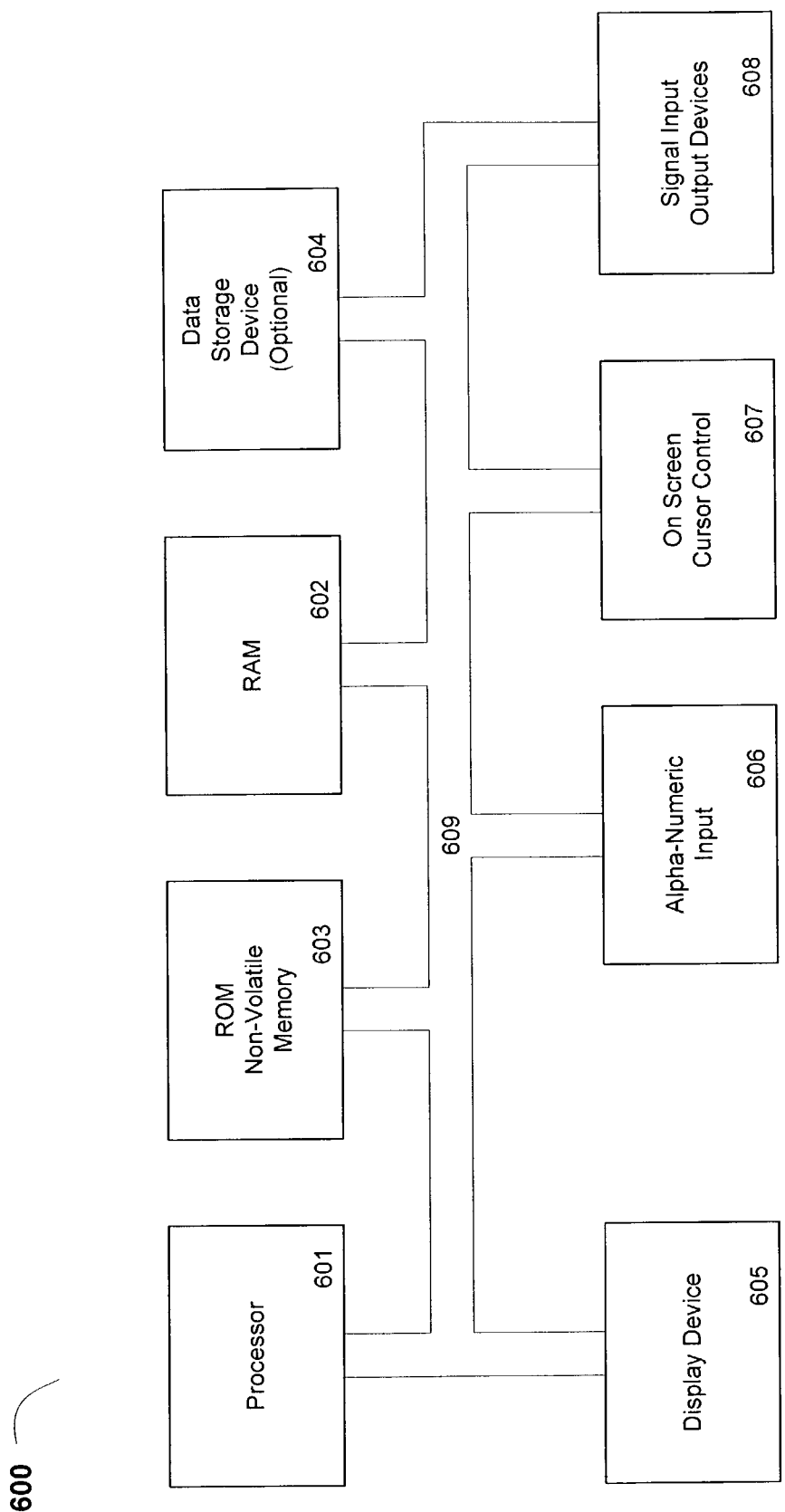
FIG. 9 is an exemplary computer system, in which the present invention may be implemented.

Referring now to FIG. 9, in a further aspect of the invention, the system comprises at least one computer system 600, which may form a platform for practicing embodiments of the invention. Computer system 600 includes an address/data bus 609 for communicating information, a central processor 601 coupled with the bus for processing information and instructions, a volatile memory 602 (e.g., random access memory or RAM) coupled with the bus 609 for storing information and instructions for the central processor 601, and a non-volatile memory 603 (e.g., read only memory or ROM) coupled with the bus 609 for storing static information and instructions for the processor 601. Computer system 600 also includes a data storage device 604 (e.g., a magnetic or optical disk and disk drive) coupled with the bus 609 for storing information and instructions. With reference still to FIG. 9, system 600 of the present invention also includes an optional alphanumeric input device 606 including alphanumeric and function keys (e.g., a conventional keyboard). Alphanumeric input device 606 may be coupled to bus 609 for communicating information and command selections to central processor unit 601. System 600 also optionally includes a cursor control device 607 (e.g., a conventional mouse) coupled to bus 609 for communicating user input information and command selections to central processor unit 601. System 600 also includes an optional display device 605 (e.g., a conventional monitor) coupled to bus 609 for displaying information. One or more signal input/output communication devices 608 coupled to bus 609 may provide communication with external devices.

The present invention has particular advantage in integrated circuits having moderate to high logic complexity, such as microprocessors, digital signal processors, field programmable gate arrays (FPGAs), complex programmable logic devices (CPLDs), and speech recognition chips.

CONCLUSION/SUMMARY

Thus, the present invention provides a convenient, simple and efficient architecture, method and system for. The present method, system and architecture greatly, enabling one to, and improve.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of placing and routing, comprising:
   a) determining a boundary condition for signal paths between components at endpoints of said signal paths in a circuit, wherein each of said components receives a clock signal and a plurality of said signal paths comprise n wires and (n−1) circuit elements in alternating serial communication between said components, n being an integer of 2 or more; and
   b) using a computer or data processing system, placing said circuit elements and routing said wires between said components and said circuit elements such that no signal path in said circuit exceeds said boundary condition, wherein said boundary condition is based on (i) a period or frequency of said clock signal and (ii) a resistivity of said wires.

2. The method of claim 1, wherein said boundary condition comprises a maximum propagation time or a maximum length of said signal paths.

3. The method of claim 2, wherein said boundary condition comprises a maximum length of said signal paths.

4. The method of claim 1, further comprising the step of routing said clock signal to said components.

5. The method of claim 1, wherein said clock signal received by each of said components is the same clock signal or a logical equivalent thereof.

6. The method of claim 1, further comprising the step of placing said components, elements, and wires in a floor plan corresponding to said circuit.

7. The method of claim 6, wherein said components are placed in said floor plan such that no signal path in said circuit exceeds said boundary condition.

8. The method of claim 7, wherein placing said components in said floor plan comprises regularly spacing said components at first endpoints of said signal paths from a nearest component at a second endpoint of each of said signal paths in said floor plan.

9. The method of claim 6, wherein placing said components in said floor plan comprises regularly spacing at least a subset of said components at first endpoints of said signal paths from a nearest component at a second endpoint of each of said signal paths.

10. The method of claim 6, further comprising determining whether any of a plurality of signal paths exceeds said boundary condition, and if any of said signal paths exceeds said boundary condition, then:
   i) re-placing at least one of said elements and/or said components in a different location in said floor plan, and
   ii) re-routing said wires between said re-placed elements and/or components such that no signal path in said circuit exceeds said boundary condition.

11. The method of claim 10, wherein said determining comprises calculating said boundary condition from circuit parameters comprising (i) a period or frequency of said clock signal and (ii) a resistivity of said wire.

12. The method of claim 11, wherein said circuit parameters further comprise (iii) a characteristic resistivity or time delay associated with each circuit element.

13. The method of claim 1, wherein said circuit elements do not receive said clock signal.

14. The method of claim 13, further comprising the step of placing said components and said circuit elements in a floor plan corresponding to said circuit.

15. The method of claim 14, further comprising the step of routing said clock signal to said components.

16. The method of claim 15, wherein said clock signal received by each of said components is the same clock signal or a logical equivalent thereof.

17. The method of claim 1, wherein said boundary condition is further based on (iii) a characteristic resistivity or time delay associated with each circuit element.

18. The method of claim 1, wherein said determining comprises calculating said boundary condition from (i) said period or frequency of said clock signal and (ii) said resistivity of said wire.

19. The method of claim 1, wherein said boundary condition is determined empirically from input data.

20. The method of claim 1, wherein said components comprise a first component at a first endpoint and a second component at a second endpoint of each of said signal paths.

21. A non-transitory computer-readable medium comprising a computer-executable set of instructions, said instructions adapted to perform the steps of:
   a) calculating a boundary condition for all signal paths between components at endpoints of said signal paths in a circuit, wherein each of said components receives a timing signal in a common clock domain, a plurality of said signal paths independently comprise n wires and (n−1) circuit elements in alternating serial communication between said components, n being an integer of 2 or more, and said boundary condition is calculated from circuit parameters comprising (i) a period or frequency of said clock signal and (ii) a resistivity of said wires; and
   b) placing said circuit elements and routing said wires between said components such that no signal path in said circuit exceeds said boundary condition.

22. The non-transitory computer-readable medium of claim 21, wherein said boundary condition comprises a maximum propagation time or a maximum length of said signal paths.

23. A non-transitory computer system comprising the computer-readable medium of claim 22, configured to execute said computer-executable set of instructions.

24. The non-transitory computer-readable medium of claim 21, further comprising the step of placing said components, elements, and wires in a floor plan corresponding to said circuit such that no signal path in said circuit exceeds said boundary condition.

25. The non-transitory computer-readable medium of claim 24, wherein placing said components in said floor plan comprises regularly spacing said components at first endpoints of said signal paths from a nearest component at a second endpoint of each of said signal paths in said floor plan.

26. The non-transitory computer-readable medium of claim 24, wherein said circuit elements are placed in said floor plan.

27. The non-transitory computer-readable medium of claim 24, further comprising determining whether any of a plurality of signal paths exceeds said boundary condition, and if any of said signal paths exceeds said boundary condition, then:
   i) re-placing at least one of said elements and/or said components in a different location in said floor plan, and
   ii) re-routing said wires between said re-placed elements and/or components such that no signal path in said circuit exceeds said boundary condition.

28. The non-transitory computer-readable medium of claim 27, wherein said determining comprises calculating said boundary condition from circuit parameters comprising (i) a period or frequency of said clock signal and (ii) a resistivity of said wire.

29. The non-transitory computer-readable medium of claim 28, wherein said circuit parameters further comprise (iii) a characteristic resistivity or time delay associated with each circuit element.

30. A non-transitory computer system comprising the computer-readable medium of claim 27, configured to execute said computer-executable set of instructions.

31. The non-transitory computer-readable medium of claim 21, further comprising the step of routing said clock signal to said components.

32. The non-transitory computer-readable medium of claim 31, wherein said clock signal received by each of said components is the same clock signal or a logical equivalent thereof.

33. The non-transitory computer-readable medium of claim 21, wherein said circuit parameters further comprise (iii) a characteristic resistivity or time delay associated with each circuit element.

34. A non-transitory computer system comprising the computer-readable medium of claim 21, configured to execute said computer-executable set of instructions.

35. The non-transitory computer-readable medium of claim 21, wherein said components comprise a first component at a first endpoint and a second component at a second endpoint of each of said signal paths.

36. The non-transitory computer-readable medium of claim 21, wherein said circuit elements do not receive said clock signal.

* * * * *

UNITED STATES PATENT AND TRADEMARK OFFICE
CERTIFICATE OF CORRECTION

PATENT NO. : 7,823,112 B1
APPLICATION NO. : 10/449757
DATED : October 26, 2010
INVENTOR(S) : Mikhail Makarov et al.

It is certified that error appears in the above-identified patent and that said Letters Patent is hereby corrected as shown below:

On the title page, item (57),

IN THE ABSTRACT
Line 9 of the Abstract: change "comments" to --components--.

IN THE SPECIFICATION
Column 11, line 15: change "This" to --Thus--.

IN THE CLAIMS
Column 12, Claim 3, line 54: change "a maximum length" to --said maximum length--.
Column 13, Claim 10, line 10: change "a plurality of signal paths" to --said plurality of signal paths--.
Column 13, Claim 18, line 40: change "said boundary condition" to --a boundary condition-- and change "said period" to --a period--.
Column 14, Claim 27, line 22-23: change "a plurality of signal paths" to --said plurality of signal paths--.

Signed and Sealed this
Twenty-sixth Day of April, 2011

David J. Kappos
*Director of the United States Patent and Trademark Office*